United States Patent
Kohola et al.

(10) Patent No.: US 9,810,584 B2
(45) Date of Patent: Nov. 7, 2017

(54) TEMPERATURE SENSOR WITH LAYERED ARCHITECTURE

(71) Applicant: Optis Circuit Technology, LLC, Plano, TX (US)

(72) Inventors: Jukka Kohola, Oulu (FI); Marko Pessa, Oulu (FI)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 242 days.

(21) Appl. No.: 14/763,613

(22) PCT Filed: Feb. 10, 2014

(86) PCT No.: PCT/EP2014/052560
§ 371 (c)(1),
(2) Date: Jul. 27, 2015

(87) PCT Pub. No.: WO2014/131607
PCT Pub. Date: Sep. 4, 2014

(65) Prior Publication Data
US 2015/0362380 A1 Dec. 17, 2015

Related U.S. Application Data

(60) Provisional application No. 61/815,034, filed on Apr. 23, 2013.

(30) Foreign Application Priority Data

Feb. 27, 2013 (EP) .................................... 13156870

(51) Int. Cl.
*G01K 7/00* (2006.01)
*G01K 7/01* (2006.01)
*G05F 3/30* (2006.01)

(52) U.S. Cl.
CPC .............. *G01K 7/01* (2013.01); *G01K 7/015* (2013.01); *G05F 3/30* (2013.01)

(58) Field of Classification Search
CPC ............. G01K 7/01; G01K 7/015; G05F 3/30
See application file for complete search history.

(56) References Cited

U.S. PATENT DOCUMENTS 6,121,824 A * 9/2000 Opris ........................ G05F 3/30
323/313
7,252,432 B1 * 8/2007 Henderson ............. G01K 1/026
327/513

(Continued)

OTHER PUBLICATIONS

International Search Report issued in corresponding International application No. PCT/EP2014/052560, dated Mar. 19, 2014.

(Continued)

*Primary Examiner* — Lisa Caputo
*Assistant Examiner* — Janice M Soto
(74) *Attorney, Agent, or Firm* — The Danamraj Law Group, P.C.; Thomas L. Crisman; Kenneth A. McClure

(57) ABSTRACT

A temperature sensor includes two branches, each branch having at least a first transistor and a second transistor connected as diodes and cascaded, so that an emitter of the first transistor is connected to a collector of the second transistor of the same branch. The temperature source also includes a current source configured to provide a current to the two branches, and an analog-to-digital convertor. The analog-to-digital convertor is connected to capture a voltage between emitters of the first transistors or of the second transistors, and is configured to convert said voltage to a digital temperature signal.

13 Claims, 2 Drawing Sheets

(56) References Cited

U.S. PATENT DOCUMENTS

2005/0151528 A1 7/2005 Marinca
2010/0002747 A1 1/2010 Bosch et al.
2014/0070078 A1* 3/2014 Land ................ H04M 1/72522
250/214.1

OTHER PUBLICATIONS

Written Opinion of the International Searching Authority issued in corresponding International application No. PCT/EP2014/052560, dated Mar. 19, 2014.
Extended European Search Report issued in corresponding European application No. 13 156 870.1, dated Feb. 11, 2014.
A. P. Brokaw; "A Simple Three-Terminal IC Bandgap Reference"; IEEE Journal of Solid-State Circuits; Dec. 1974; pp. 388-393; vol. SC-9, No. 6.

* cited by examiner

TEMPERATURE SENSOR WITH LAYERED ARCHITECTURE

FIELD OF THE INVENTION

The invention relates to methods and apparatus for sensing a temperature and generating an output representative for this sensed temperature.

In particular, the invention can apply in situation where a high accuracy is needed while the temperature is close to the silicon die limits and while processing power should be kept as low as possible.

BACKGROUND OF THE INVENTION

A typical scheme for sensing the temperature on a silicon die is illustrated by the FIG. 1.

It makes use of a p-n junction of a transistor T operating as a "diode". A current $i_{bias}$ is provided and the fluctuations of the voltage $V_{sense}$ can be provided to an analog-to-digital converter ADC, so as to provide a measurement of the sensed temperature.

However, such a simple approach has many major drawbacks, especially because it relies on several serial elements. More specifically, each of these elements may be a source of errors: current source CS inaccuracy, PN junction variations, ADC inaccuracy, etc. Each error accumulates at each stage so as, at the end, the resulting measurement is clearly jeopardized.

Consequently, other schemes have been designed like for instant those based on the PTAT principle.

Voltage generating circuits are well known in the art and are used to provide a voltage output with defined characteristics. Among applications of such circuits are circuits adapted to provide an output that is proportional to a sensed absolute temperature. These circuits are known under the acronym PTAT (Proportional To Absolute Temperature).

FIG. 2 illustrates a typical embodiment of the PTAT principle.

The circuits is made of two branches, A, B, wherein each branch comprises a transistor, respectively $T_A$, $T_B$ and two current sources $CS_A$, $CS_B$ respectively.

The two current sources provides currents with intensity $i_A$, $i_B$ respectively.

The two transistors $T_A$, $T_B$ are connected in a diode configuration wherein the base of each transistor is connected to its collector, thereby forming PN junctions that are used for measuring temperature, as explained before. The junctions can have equal areas or unequal areas, resulting in equal or different charges, $Q_A$, $Q_B$ respectively.

Then, the differential voltage $\Delta V_{AB}$ between the emitters of the two transistors is proportional to the absolute temperature of the silicon die on which the transistors are implemented.

The voltage is given by the following equation:

$$\Delta V_{AB} = \frac{k \cdot T}{q} \cdot \ln\left(\frac{i_B}{i_A}\right)$$

Wherein:
K is the Boltzmann constant,
Q is the charge of the electron, and
T is the operating temperature in Kelvin.

This equation has for instance been described in "*A Simple Three-Terminal IC Bandgap Reference*" of Paul Brokaw, in IEEE Journal of Solid-State Circuits, vol. sc-9, no. 6, December 1974.

The equation makes it clear that the voltage $\Delta V_{AB}$ is proportional to the temperature T. The voltage $\Delta V_{AB}$ can then be provided to an analog-to-digital convertor (ADC, not depicted).

The major issue is that the temperature variation is normally small so that the voltage $\Delta V_{AB}$ is also small. This implies an important constraint to the analog-to-digital convertor which should be very accurate to reflect precisely the sensed voltage $\Delta V_{AB}$, especially in the low-figure domain.

In practice, due to the small figure of the voltage $\Delta V_{AB}$ and its digital conversion, the resulting temperature measurement is poor.

SUMMARY OF THE INVENTION

The object of the present invention is to alleviate at least partly the above mentioned drawbacks.

This object is achieved with Temperature sensor comprising:
two branches, each branch comprising at least two transistors connected as diodes and cascaded so that the emitter of the transistor of a first layer of a branch is connected to the collector of the transistor of a second layer of the same branch,
current providing means for providing a current to both branches,
an analog-to-digital convertor for capturing a voltage between emitters of the transistors of a same layer of both branches and converting said voltage to a digital temperature signal.

Preferred embodiments comprise one or more of the following features:

The temperature sensor further comprises switches to connect said analog-to-digital convertor to the emitter of the transistors of a selected layer.

The switches are commanded so that said analog-to-digital convertor captures alternatively the voltage at the emitters of the transistors of said respective same layer.

All transistors of a first branch have a same first PN junction area and all transistors of a second branch have a same second PN junction area, said second PN-junction area being different from said first PN junction area by a predetermined factor.

The predetermined factor is equal to 64.

The switches are adapted to connect said analog-to-digital convertor to the emitter of the transistors of a selected layer according to said digital temperature signal.

The Temperature sensor further comprises switches for connecting and disconnecting said current providing means to said branches.

Another aspect of the invention concerns a method for sensing a temperature comprising:
providing a current to two branches, each branch comprising at least two transistors connected as diodes and cascaded so that the emitter of the transistor of a first layer of a branch is connected to the collector of the transistor of a second layer of the same branch,
capturing a voltage between emitters of the transistors of a same layer of both branches and converting said voltage to a signal temperature signal, by an analog-to-digital convertor.

Preferred embodiments comprise one or more of the following features:
- The method further comprises connecting said analog-to-digital convertor to the emitter of the transistors of a selected layer by switches.
- The switches are commanded so that said analog-to-digital convertor captures alternatively the voltage at the emitters of the transistors of said respective same layer.
- All transistors of a first branch have a same first PN-junction area and all transistors of a second branch have a same second PN junction area, said second PN-junction area being different from said first PN junction area by a predetermined factor.
- The predetermined factor is equal to 64.
- The analog-to-digital convertor can be connected to the emitter of the transistors of a selected layer according to said digital temperature signal.
- The method further comprises connecting and disconnecting said current providing means to said branches by switches.

Another aspect of the invention concerns a mobile communication device comprising a temperature sensor as previously described.

Further features and advantages of the invention will appear from the following description of embodiments of the invention, given as non-limiting examples, with reference to the accompanying drawings listed hereunder.

DETAILED DESCRIPTION OF THE INVENTION

Figure 1:
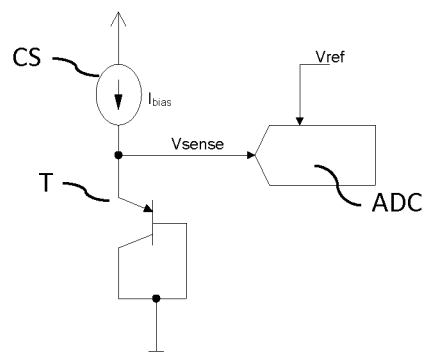
FIG. 1 shows a typical scheme for sensing the temperature on a silicon die according to prior art.
Figure 2:
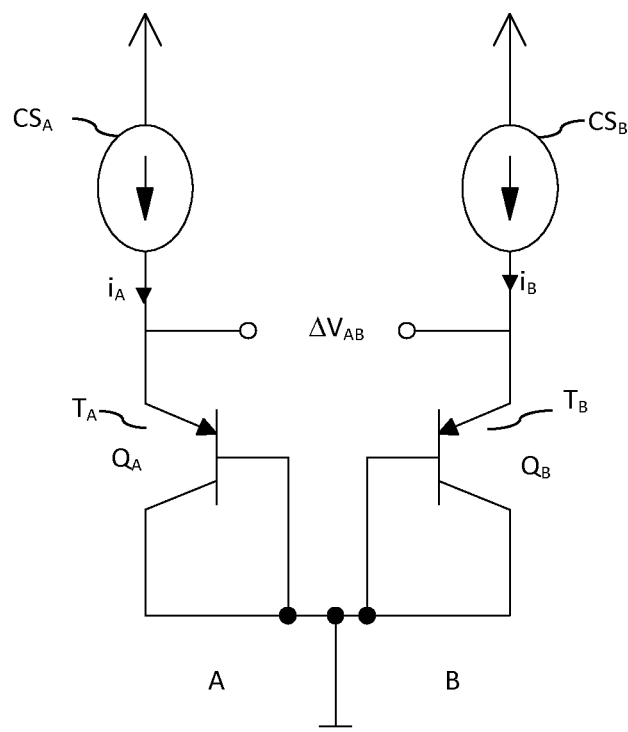
FIG. 2 shows a typical embodiment of the PTAT principle according to prior art.
Figure 3:
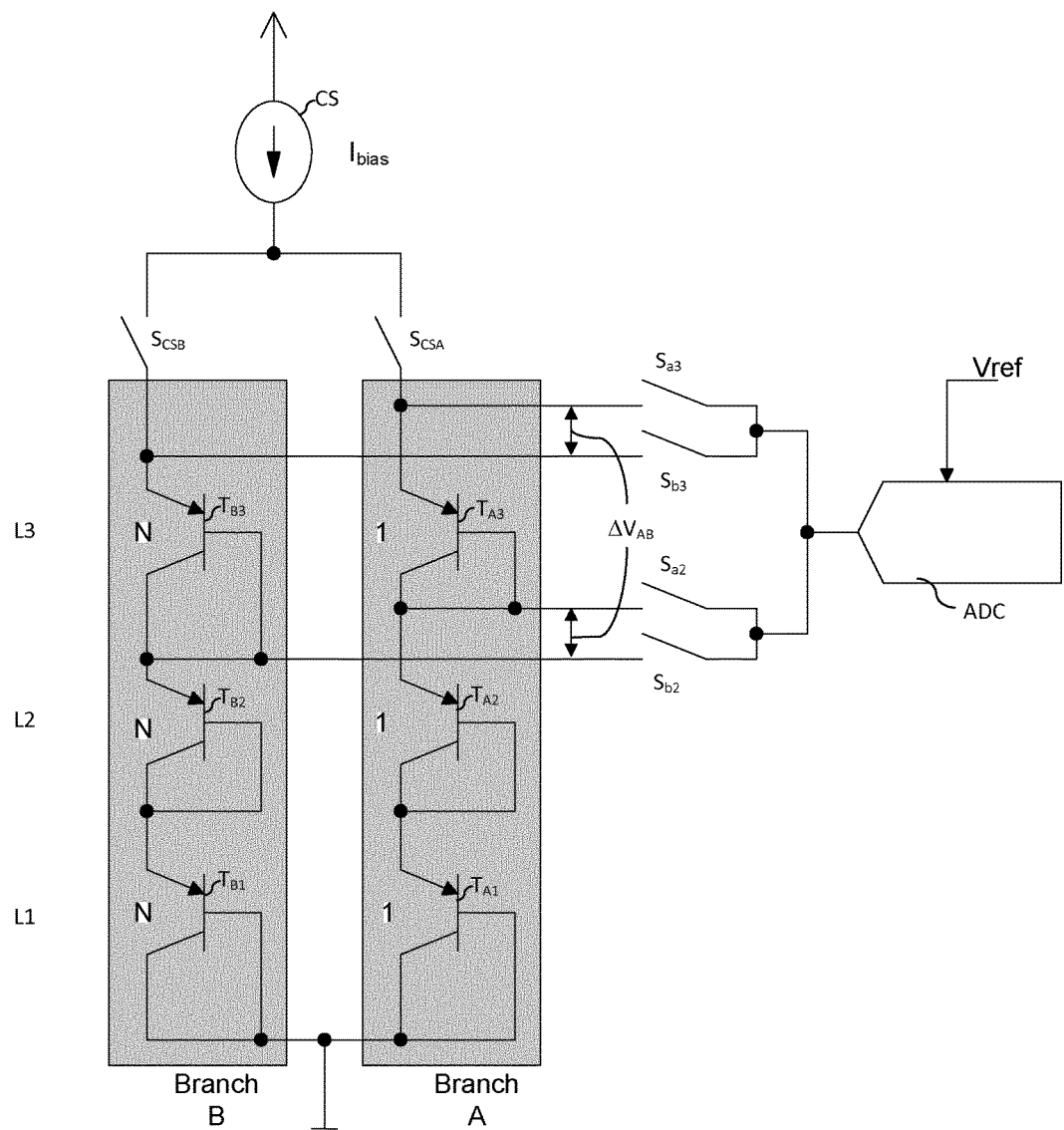
FIG. 3 shows an embodiment of a temperature sensor according to the invention.

FIG. 3 is a high-level schema representing an embodiment of a temperature sensor according to the invention.

In this embodiment, the temperature sensor comprises two branches A, B comprising each 3 transistors $T_{A1}$, $T_{A2}$, $T_{A3}$, $T_{B1}$, $T_{B2}$, $T_{B3}$.

The transistors are connected as diodes. It means that the collector and the base are connected together, thereby forming PN junctions.

In this embodiment, there are 3 layers, L1, L2, L3. Each layer corresponds to a transistor in each of the branch:
- Layer 1 corresponds to a transistor $T_{A1}$ in branch A, and to a transistor $T_{B1}$ in branch B;
- Layer 2 corresponds to a transistor $T_{A2}$ in branch A, and to a transistor $T_{B3}$ in branch B;
- Layer 3 corresponds to a transistor $T_{A3}$ in branch A, and to a transistor $T_{B3}$ in branch B.

In each branch, the transistors are cascaded so that the emitter of the transistor of a first layer of a branch is connected to the collector of the transistor of a second layer of the same branch, the two layers being successive:
- The emitter of the transistor $T_{A1}$ is connected to the collector of the transistor $T_{A2}$;
- The emitter of the transistor $T_{A2}$ is connected to the collector of the transistor $T_{A3}$;
- The emitter of the transistor $T_{B1}$ is connected to the collector of the transistor $T_{B2}$;
- The emitter of the transistor $T_{B2}$ is connected to the collector of the transistor $T_{B3}$.

The collectors (and the bases) of the transistors $T_{A1}$, $T_{B1}$ of the first layer L1 are grounded, whereas the emitters of the transistors $T_{A3}$, $T_{B3}$ of the third layer L3 are connected to current providing means CS.

These current providing means are able to provide a current $i_{bias}$ to the two branches A, B.

Several embodiments are possible. In the example depicted in FIG. 3, the current providing means are implemented as a single current source CS.

The current source CS provides a current $i_{bias}$ which is then driven to both branches A, B. The current source can be linked to the branches A, B (or more concretely to the transistors of the last layer L3 for each branch) by switches $S_{CSA}$, $S_{CSB}$. these Switches Enable to Connect or Disconnect the Current Source CS to the branches.

Another embodiment consists in having two current sources, each driving its own branch.

Furthermore, the temperature sensor comprises means for capturing a voltage $\Delta V_{AB}$ between the transistors of both branches at a same layer, for instance L2 or L3, and especially between the emitters of these transistors.

This voltage $\Delta V_{AB}$ is representative of the temperature and can be provided to an analog-to-digital convertor (ADC) for converting this voltage to a digital temperature signal.

The analog-to-digital convertor ADC can be connected to the emitters by switches $S_{a2}$, $S_{b2}$, $S_{a3}$, $S_{a3}$.

This allows switching between several configurations by selecting a particular layer:
- In a first configuration, the voltage $\Delta V_{AB}$ is captured at the emitters of the transistors $T_{A2}$ and $T_{B2}$ of the layer 2.
- In a second configuration, the voltage $\Delta V_{AB}$ is captured at the emitters of the transistors $T_{A3}$ and $T_{B3}$ of the layer 3.

Also, according to an embodiment of the invention, the analog-to-digital convertor ADC captures alternatively the voltage at the emitters of the transistors $T_{A2}$, $T_{B2}$ of a same layer.

The analog-to-digital convertor ADC may capture the voltage value at each time slot, in accordance with a reference voltage $V_{ref}$. The differential voltage $\Delta V_{AB}$ is captured, or determined, after 2 time slots by simply subtracting two consecutive captured voltage values.

For instance, if the circuit is configured as a 3-layer configuration, during a first time slot, the switches $S_{a3}$, $S_{b3}$ are configured to that the analog-to-digital convertor captures the voltage value between the emitter of the transistor, $T_{a3}$ and the reference voltage $V_{ref}$ In the next time slot, the switches $S_{a3}$, $S_{b3}$ are reconfigured to that the analog-to-digital convertor captures the voltage value between the emitter of the transistor, $T_{b3}$ and the reference voltage $V_{ref}$. $\Delta V_{AB}$ can then be directly decided from these 2 measurements.

The switches $S_{a3}$, $S_{b3}$ can be commanded to alternatively connect the analog-to-digital convertor ADC to the emitter of a different transistor, $T_{a3}$.

The conversion time and the switching from one branch to the other is very quick, typically below 50 whereas the temperature evolution is at a slower scale, typically slower than 1° C./ms. Therefore the fact that the tension is captured at two different times for both branches has no impact on the accuracy of the determined temperature.

Other embodiments for capturing the voltage $\Delta V_{AB}$ are also possible.

For instance, a differential-to-single ended signal converter can be added between the branches and the analogto-digital convertor to convert the time-shifted samples at each branch into a single signal that is then inputted in the ADC (the ADC has, in this case, only one inputs).

It should be clear that the invention comprises the feature of providing an analog-to-digital convertor ADC for
capturing a voltage $\Delta V_{AB}$ between emitters of the transistors $T_{A2}$, $T_{B2}$ of a same layer of both branches and converting said voltage to a digital temperature signal, However, the invention does not lie in particular way to do this capture, and in particular if some further elements are introduced downstream or upstream to the analog-to-digital converter ADC.

In an embodiment of the invention, all transistors of a first branch B have a same first PN junction area $a_B$ and all transistors of the second branch A have a same second PN-junction area $a_A$. The second PN-junction area $a_A$ is different from the first PN junction area $a_A$ by a predetermined factor N, so that:

$$N = \frac{a_B}{a_A}$$

Since the current intensity $i_{bias}$ is driven to both branches, the voltage $\Delta V_{AB}$ can be expressed from the areas of the respective PN-junction of the transistors of the two branches. At the output of a 1-layer configuration, the voltage $\Delta V_{AB}$ would express:

$$\Delta V_{AB} = \frac{k \cdot T}{q} \cdot \ln\left(\frac{a_B}{a_A}\right)$$

In a 2-layer configuration, the voltage $\Delta V_{AB}$ is given by:

$$\Delta V_{AB} = 2 \cdot \frac{k \cdot T}{q} \cdot \ln\left(\frac{a_B}{a_A}\right) = 2 \cdot \frac{k \cdot T}{q} \cdot \ln(N)$$

In a 3-layer configuration, the voltage $\Delta V_{AB}$ is given by:

$$\Delta V_{AB} = 3 \cdot \frac{k \cdot T}{q} \cdot \ln\left(\frac{a_B}{a_A}\right) = 3 \cdot \frac{k \cdot T}{q} \cdot \ln(N)$$

According to this embodiment, two parameters can be set up in order to optimize the digital temperature signal provided by the analog-to-digital convertor ADC:
The predetermined factor N,
The number of layers of the architecture.

These parameters can be chosen according to the conditions under which the temperature sensor should be operating.

The parameters should be chosen also according to the technical characteristics of the analog-to-digital converter ADC, e.g. so as to avoid its saturation and getting a good enough excursion of the input signal, i.e. the measured voltage $\Delta V_{AB}$.

Under some conditions, N can be equal to 64.

The number of layers can typically be equal to 2 or 3, although other values may be acceptable according to the conditions. For instance, if the ADC input channel range is around 1.8 V, and the temperature is a normal room temperature, only 2 layers are needed to avoid ADC saturation. With hotter temperature, a better accuracy is achieved with 3 layers.

According to an embodiment of the invention, the digital temperature signal can be used, in a back-loop, to control the switches and select the appropriate configuration dynamically.

In the case of a 3-layer configuration, the voltage $\Delta V_{AB}$ is given by:

$$\Delta V_{AB} \approx 293.5 \text{ mV} + 1.075 \text{ mV} \times T_c$$

where $T_c$ is the temperature expressed in Celsius.

Accordingly, a change of 1° C. in temperature results in a variation of the voltage $\Delta V_{AB}$ of:

$$\frac{d\Delta V_{AB}}{dT} = 1.075 \text{ mV}$$

If the analog-to-digital convertor ADC is a 10-bits ADC having a 1.8 V input range, the Least Significant Bit (LSB) corresponds to 1.64° C.

This may be considered as a sufficient level to avoid conversion problems induced by the analog-to-digital convertor ADC like quantization errors or Integrated Non Linearity (INL).

As the determination of the sensed temperature rely on the difference of two PN junctions, process deviation does not play a role. Thus, no calibration is required.

Similarly, as a common bias current is driven to both branches A, B, current mismatch does not play a role.

The accuracy of the temperature sensor according to the invention comes directly from the mismatch of the PN junctions of the 2 branches, i.e. from a deviation of the ideal predetermined factor N.

By staggering different amounts of PN-junctions, the gain of the sensor can be selected as optimal with respect to the ADC conversion range.

The invention has been described with reference to preferred embodiments. However, many variations are possible within the scope of the invention.

The invention claimed is:

1. A temperature sensor comprising: two branches, each branch including at least a first transistor and a second transistor connected as diodes and cascaded so that an emitter of the first transistor of a first layer of a branch is connected to a collector of the second transistor of a second layer of the same branch a current source configured to provide a current to the two branches; and an analog-to-digital convertor connected to capture a voltage between emitters of the first transistors or of the second transistors, and configured to convert said voltage to a digital temperature signal, wherein the first and the second transistor of a first branch among the two branches have a same first PN-junction area and a first and a second transistor of a second branch among the two branches have a same second PN-junction area, said second PN-junction area being different from said first PN-junction area by a predetermined factor.

2. The temperature sensor according to claim 1, further comprising switches configured to connect said analog-to-digital convertor to the emitters of the first transistors or of the second transistors.

3. The temperature sensor according to claim 2, wherein said switches are commanded so that said analog-to-digital convertor captures alternatively the voltage at the emitters of the first transistors and of the second transistors, respectively.

4. The temperature sensor according to claim 2, wherein said switches are commanded to be opened or closed according to said digital temperature signal.

5. The temperature sensor according to claim 1, wherein said predetermined factor is equal to 64.

6. The temperature sensor according to claim 1, further comprising switches for connecting and disconnecting said current source to said two branches.

7. A method for sensing a temperature comprising: providing a current to two branches, each of the two branches including at least a first transistor and a second transistor connected as diodes and cascaded so that an emitter of the first transistor is connected to a collector of the second transistor of the same branch, capturing a voltage between emitters of the transistors of the first transistors; and converting said voltage to a signal temperature signal, by an analog-to-digital convertor, wherein the first and the second transistor of a first branch among the two branches have a same first PN-junction area and a first and a second transistor a second branch among the two branches have a same second PN-junction area, said second PN-junction area being different from said first PN-junction area by a predetermined factor.

8. The method for sensing a temperature according to claim 7, further comprising: connecting said analog-to-digital convertor to the emitter of the transistors of a selected layer by switches.

9. The method for sensing a temperature according to claim 7, wherein said switches are commanded so that said analog-to-digital convertor captures alternatively a voltage at the emitters of the first transistors and of the second transistors, respectively.

10. The method for sensing a temperature according to claim 8, wherein said analog-to-digital convertor is connected to the emitters of the first transistors or of the second transistors according to said digital temperature signal.

11. The method for sensing a temperature according to claim 7, wherein said predetermined factor is equal to 64.

12. The method for sensing a temperature according to claim 7, further comprising:
connecting and disconnecting a current source providing said current to said two branches by switches.

13. A mobile communication device comprising a temperature sensor having: two branches, each branch including at least a first transistor and a second transistor connected as diodes and cascaded so that an emitter of the first transistor of a first layer of a branch is connected to a collector of the second transistor of a second layer of a branch of the same branch; a current source configured to provide a current to the two branches; and an analog-to-digital convertor connected to capture a voltage between emitters of the first transistors or of the second transistors, and configured to convert said voltage to a digital temperature signal, wherein the first and the second transistor of a first branch among the two branches have a same first PN-junction area and a first and a second transistor a second branch among the two branches have a same second PN-junction area, said second PN-junction area being different from said first PN-junction area by a predetermined factor.

* * * * *